（12) United States Patent
Ferenc

(10) Patent No.: US 7,526,981 B2
(45) Date of Patent: May 5, 2009

(54) PARKING BRAKE ACTUATOR WITH INTEGRATED LIGHT SWITCH

(75) Inventor: Anthony Stephen Ferenc, Goodrich, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 706 days.

(21) Appl. No.: 10/815,085

(22) Filed: Mar. 31, 2004

(65) Prior Publication Data

US 2005/0217411 A1   Oct. 6, 2005

(51) Int. Cl.
 *G05G 5/06* (2006.01)
(52) U.S. Cl. ........................................... 74/529
(58) Field of Classification Search ............. 74/519, 74/523, 525, 526, 529, 537, 543, 545; 340/453, 340/457.3; 200/61–89; 362/540, 541, 542, 362/464
See application file for complete search history.

(56) References Cited

U.S. PATENT DOCUMENTS

| | | | | |
|---|---|---|---|---|
| 4,212,211 A | * | 7/1980 | Rickert | 74/538 |
| 4,230,919 A | * | 10/1980 | Schantz et al. | 200/462 |
| 4,281,736 A | * | 8/1981 | Lizzio | 180/271 |
| 4,431,884 A | * | 2/1984 | Flumignan et al. | 200/462 |
| 4,462,487 A | * | 7/1984 | Warwick et al. | 192/219.7 |
| 4,553,650 A | * | 11/1985 | Warwick et al. | 192/219.7 |
| 4,876,914 A | * | 10/1989 | Kanno | 74/538 |
| 5,243,856 A | * | 9/1993 | Yamazaki et al. | 74/538 |
| 5,624,352 A | * | 4/1997 | Smale | 477/197 |
| 5,793,007 A | * | 8/1998 | Matsumoto | 200/61.87 |
| 6,786,307 B2 | * | 9/2004 | Komatsubara et al. | 188/2 D |

* cited by examiner

*Primary Examiner*—Vicky A Johnson
(74) *Attorney, Agent, or Firm*—Porter, Wright, Morris & Arthur LLP; Richard M. Mescher; Dean B. Watson

(57) ABSTRACT

A parking brake actuator for a motor vehicle includes a fixed support, a lever pivotably connected to the support for movement between brake-releasing and brake-engaging positions, and a locking mechanism adapted to releasably maintain the lever in the brake-engaging position. An electrical switch has a blade operable to indicate when the lever is out of the brake releasing position. The fixed support forms a unitary mounting bracket for securing the switch blade to the fixed support so that the switch is integrated with the actuator. The fixed support and the unitary mounting bracket are preferably unitarily molded of plastic. The switch is preferably located near a mounting hole formed in the fixed support which receives a fastener to secure the fixed support to the motor vehicle. The switch can then extend to the mounting hole to contact the fastener and connect the switch to motor vehicle ground.

16 Claims, 2 Drawing Sheets

PARKING BRAKE ACTUATOR WITH INTEGRATED LIGHT SWITCH

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a parking brake actuator for a motor vehicle and, more particularly, to such an actuator which has a light switch for indicating when the parking brake has been actuated.

BACKGROUND OF THE INVENTION

It is well known in the prior art for a motor vehicle parking brake system to include a light switch. The light switch is triggered by operation of the parking brake actuator to trigger the illumination of a signal light or other signal to the operator that the parking brake is engaged and/or disengaged.

As shown in FIG. 1, the light switch 2 typically has a housing 4 which contains the various components of the light switch 2. The housing 4 is secured to separate the parking brake bracket 6 with a mechanical fastener such as a screw 8. The light switch 2 is connected to the electrical system with wires, cables, pigtails or the like including a connection to a ground of the motor vehicle. Thus the light switch 2 is a separate "off the shelf" component which is attached to the parking brake system during assembly.

While these prior parking brake systems are adequate to trigger the illumination of the signal light during operation of the parking brake, there is an ongoing desire to reduce weight, cost, number of components, and complexity of all motor vehicle systems including parking brakes. Accordingly, there is a need in the art for an improved parking brake system which reduces weight, cost, number of components, and/or complexity.

SUMMARY OF THE INVENTION

The present invention provides a parking brake actuator which overcomes at least some of the above-noted problems of the related art. According to the present invention, a parking brake actuator includes, in combination, a fixed support, a lever pivotably connected to the support for movement between brake-releasing and brake-engaging positions, and a locking mechanism adapted to releasably maintain the lever in said brake-engaging position. An electrical switch has a blade operable to indicate when the lever is out of the brake releasing position. The switch blade is secured directly to said fixed support so that the switch is integrated with the parking brake actuator.

According to another aspect of the present invention, a parking brake actuator includes, in combination, a fixed support, a lever pivotably connected to the support for movement between brake-releasing and brake-engaging positions, and a locking mechanism adapted to releasably maintain the lever in the brake-engaging position. An electrical switch has a blade operable to indicate when the lever is out of the brake releasing position. The fixed support forms a unitary mounting bracket for securing the switch blade to the fixed support. The fixed support and the unitary mounting bracket are preferably molded of plastic.

According to another aspect of the present invention, a parking brake actuator includes, in combination, a fixed support, a lever pivotably connected to the support for movement between brake-releasing and brake-engaging positions, and a locking mechanism adapted to releasably maintain the lever in the brake-engaging position. An electrical switch operable to indicate when the lever is out of the brake releasing position. A switch is located near a mounting hole formed in the fixed support which receives a fastener to secure the fixed support to the motor vehicle. The switch extends to the mounting hole to contact the fastener in the mounting hole to connect the switch to ground.

From the foregoing disclosure and the following more detailed description of various preferred embodiments it will be apparent to those skilled in the art that the present invention provides a significant advance in the technology and art of parking brake systems. Particularly significant in this regard is the potential the invention affords for providing a high quality, reliable, low cost assembly which does not accidently release the parking brake. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
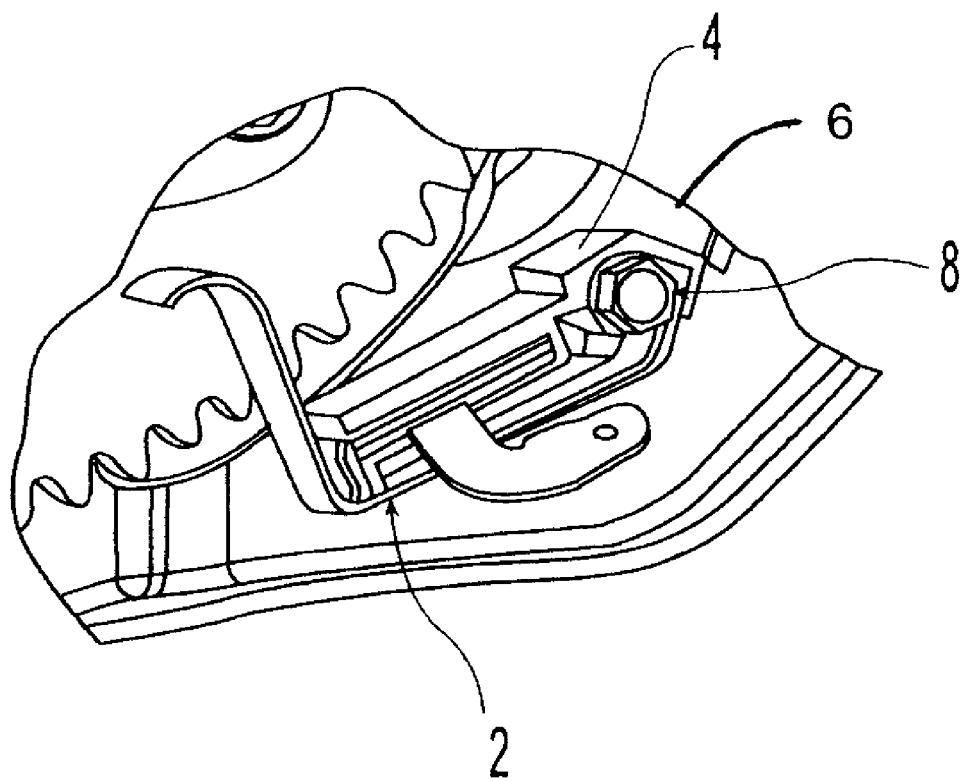
FIG. 1 is a fragmented perspective view showing a light switch of a prior art parking brake actuator.

It should be understood that the appended drawings are not necessarily to scale, presenting a somewhat simplified representation of various preferred features illustrative of the basic principles of the invention. The specific design features of a parking brake actuator as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the parking brake system illustrated in the drawings. In general, up or upward refers to an upward direction within the plane of the paper in FIG. 2 and down or downward refers to a downward direction within the plane of the paper in FIG. 2. Also in general, fore or forward refers to a direction toward the front of the vehicle, that is, to the left within the plane of the paper in FIG. 2 and aft or rearward refers to a direction toward the rear of the vehicle, that is, to the right within the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved parking brake system disclosed herein. The following detailed discussion of various alternative and preferred embodiments will illustrate the general principles of the invention with reference to a preferred embodiment. Other embodiments suitable for other applications, such as a foot-operated parking brake system, will be apparent to those skilled in the art given the benefit of this disclosure.

Figure 2:
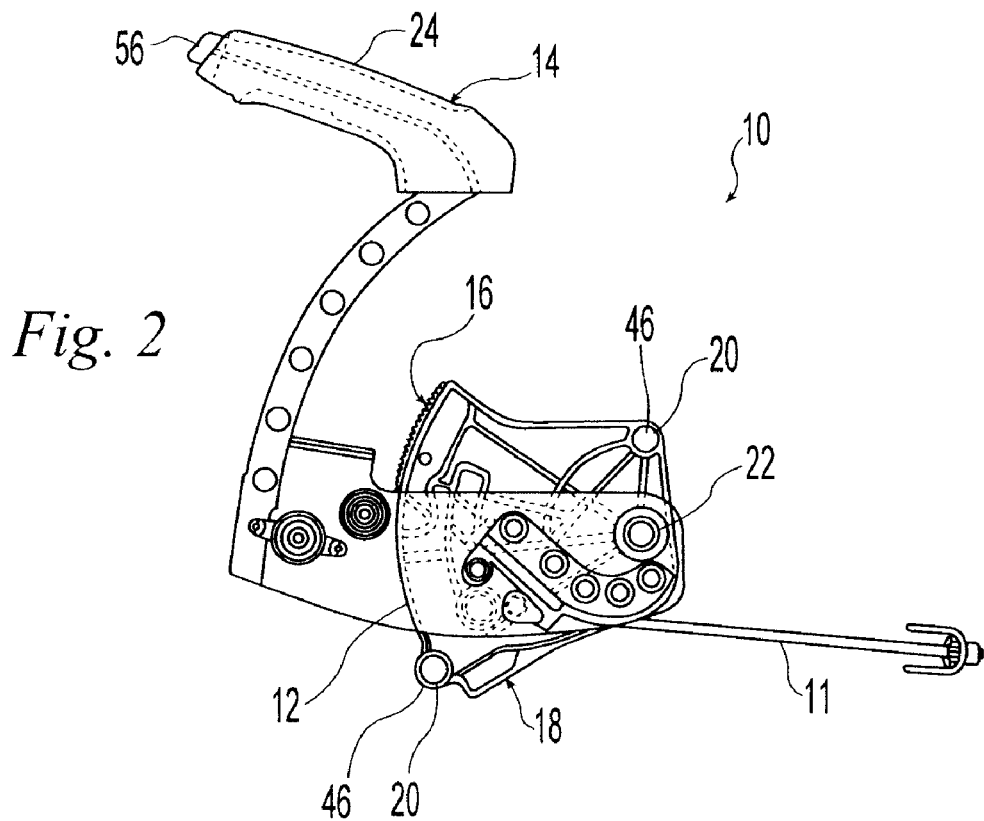
FIG. 2 is a side elevational view of a hand-operated parking brake actuator according to a preferred embodiment of the present invention.
Figure 3:
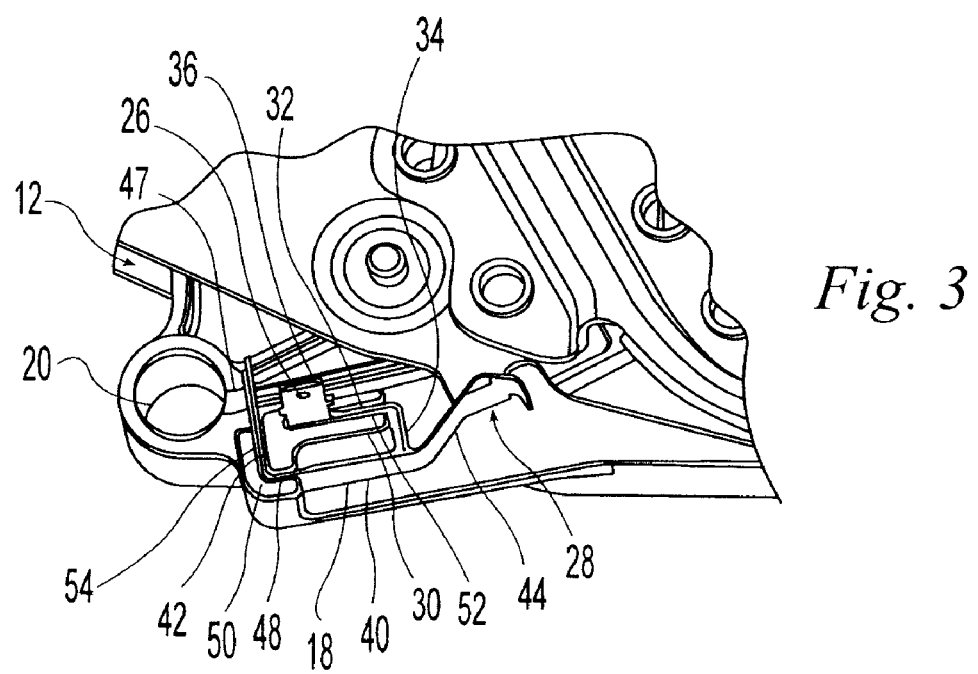
FIG. 3 is a fragmented perspective view showing a light switch of the parking brake actuator of FIG. 2.

Referring now to the drawings, FIGS. 2 and 3 show a parking brake actuator 10 of the hand-operated type according to a preferred embodiment of the present invention. The parking brake actuator 10 is adapted to tension and untension a parking brake cable 11 to respectively engage and release a parking brake. The illustrated parking brake actuator 10 includes a fixed support or housing 12, an operating lever 14 pivotably attached to the support 12 for movement between a cable untensioning or brake-releasing position and a cable tensioning or brake-engaging position, a locking mechanism 16 adapted to releasably maintain the operating lever 14 in the brake-engaging position, and a integrated light switch 18 operated by movement of the operating lever 14 to illuminate a signal light or another suitable signal to the operator that the parking brake is engaged and/or disengaged.

The fixed support 12 is preferably rigidly secured to the motor vehicle using mechanical fasteners such as, for example screws or bolts. The illustrated fixed support is provided with a plurality of openings 20 for the mechanical fasteners. The operating lever 14 is pivotably connected to the support 12 by a pivot pin 22. The illustrated operating lever 14 is adapted as a hand operated lever and is provided with a hand grip 24 at its free end. The operating lever 14 selectively pivots about the pivot pin 22 and is maintained in the brake engaging position by the locking mechanism 16 which operates between the operating lever 14 and the fixed support 12 in any suitable manner.

The locking mechanism 16 is adapted to releasably maintain the operating lever 14 in the brake-engaging position, and preferably in any other desired position. The locking mechanism 16 can be a ratchet and pawl type lock or any other suitable type of locking mechanism as is known in the art. See, for example, U.S. Pat. Nos. 6,662,676, 6,282,980, 5,819,595, 5,272,935, 5,001,942, and 4,819,501, the disclosures of which are expressly incorporated herein in their entireties by reference, which show examples of suitable locking mechanisms.

The illustrated light switch 18 is integrated with the fixed support 12 and is spaced from the pivot pin 22 of the operating lever 14 in a position to be engaged by the operating lever 14 when the operating lever 14 is in its brake releasing position. The illustrated light switch 18 is also located near a mounting fastener opening 20 of the fixed support 12. It is noted that the light switch 18 can alternatively be located in other suitable positions.

The illustrated light switch 18 includes a switch terminal 26, a switch blade 28 operable to interact with the switch terminal 26 to open and close an electrical circuit which illuminates the signal light when desired, and a mounting bracket 30 securing the switch terminal 26 and the switch blade 28 directly to the fixed support 12. The switch terminal 26 and switch blade 28 are preferably formed of suitable conductive materials.

The illustrated switch terminal 26 has an elongate main or attachment portion 32, a contact or leg portion 34 downwardly extending from a first end of the attachment portion 32, and a connection or terminal portion 36 laterally extending from the second end of the attachment portion 32 opposite the leg portion. The illustrated attachment portion 32 is generally planar and is adapted to secure the switch terminal 26 to the fixed support 12. The illustrated contact portion 34 is generally planar and perpendicular to the attachment portion 32. The contact portion 34 is adapted to contact the switch blade 28 to close the electrical circuit as described in more detail hereinafter. The illustrated terminal portion 36 is generally planar and coplanar with the attachment portion 32. The terminal portion 36 is adapted to be connected to a suitable conductor such as a wire, cable, pigtail or the like to connect the terminal portion 36 to the electrical circuit as described in more detail hereinafter. The illustrated terminal portion 36 is provided with an opening for ease of soldering or otherwise connecting a conductor thereto.

The illustrated switch blade 28 has an elongate main or contact portion 40, an attachment or terminal portion 42 upwardly extending from a first end of the contact portion 40, and an actuating or handle portion 44 upwardly extending from the second end of the contact portion 40 opposite the attachment portion 42. The illustrated contact portion 40 is generally planar and is adapted to contact the switch terminal 26 to close the electrical circuit as described in more detail hereinbelow. The illustrated attachment portion 42 is generally planar and perpendicular to the contact portion 40. The attachment portion 42 is adapted to secure the switch blade 28 to the fixed support 12. The illustrated handle portion 44 is generally planar and shaped to cooperate with the operating lever 14. The handle portion 44 is adapted to interact with the operating lever 14 to open and close the light switch 18 in a desired manner as described in more detail hereinafter.

The illustrated attachment portion 42 of the switch blade 28 is also adapted connect the light switch 18 to motor vehicle ground by extending to the adjacent fastener opening 20 to connect the switch blade 28 to motor vehicle ground. A conductive connection is obtained by contacting the mechanical fastener 46 of the fixed support 12 which extends into a frame or other suitable component of the motor vehicle to complete an electrical connection to motor vehicle ground. The illustrated switch blade 28 contacts a conductive insert 47 forming the mounting fastener opening 20 to connect to the fastener. It is noted however, the conductive path can be formed in other suitable manners such as, for example, the switch blade 28 could extend into the opening 20 and directly contact the fastener 46, the switch blade 28 could have a flange which extends below the head of the fastener 46, or any other suitable manner.

The illustrated fixed support 12 includes the integral mounting bracket 30 for directly connecting the switch terminal 26 and the switch blade 28 to the fixed support 12 without the use of mechanical fasteners, such as screws, bolts, or rivets. The illustrated mounting bracket 30 is unitary with the fixed support 12, that is, the fixed support 12 and the mounting bracket 30 are formed as a single component rather than separate components secured together. Preferably, the fixed support 12 and mounting bracket 30 are molded of plastic as a one-piece component.

The illustrated mounting bracket 30 includes first and second bodies 48, 50 forming first and second slots or channels 52, 54 but other suitable configurations can be utilized. The first body 48 forms the first slot 52 which is sized and shaped to closely receive the attachment portion 32 of the switch terminal 26. The illustrated first slot 52 extends generally horizontal and is open at one end so that the attachment portion 32 can partially extend from the first slot 52 with the contact portion 34 of the switch terminal 26 extending downwardly outside of the first slot 52. The illustrated first slot 52 also has an open lateral side so that the switch terminal 26 can be inserted therein and the terminal portion 36 can be located outside thereof. With the switch terminal 26 located partially in the first slot 52 in this manner, the switch terminal 26 is rigidly secured to the fixed support 12 without the use of mechanical fasteners. The illustrated second body 50 cooperates with the first body 48 to form the second slot 54 therebetween. The illustrated second slot 54 is generally "L-shaped" having a first or vertical portion sized and shaped to closely receive the attachment portion 42 of the switch blade 28 therein and a second or horizontal portion that extends generally horizontal and shaped to closely receive the end of the contact portion 40 of the switch blade 28 therein. The ends of the illustrated second slot 54 are open so that the switch blade 28 can partially extend from the second slot 54. The illustrated second slot 54 also has an open lateral side so that the switch blade 28 can be inserted therein. With the switch blade 28 located partially in the second slot 54 in this manner, the switch blade 28 is rigidly secured to the fixed support 12 without the use of mechanical fasteners. With the switch blade 28 located partially in the second slot 54 in this manner, the contact portion 40 of the switch blade 28 is in electrical contact with the contact portion 34 of the switch terminal 26. It is noted that the contact portion 40 of the switch blade 28 extends from the second slot 54 in a cantilevered manner so that the contact portion 40 of the switch blade 28 can be resiliently flexed out of electrical contact with the switch terminal 26 when a suitable downward force is applied to the handle portion 44 of the switch blade 28. The illustrated operating lever 14 and the handle portion 44 of the switch blade 28 are sized and shaped such that the operating lever 14 holds the switch blade 28 out of contact with the switch terminal 26 when the operating lever 14 is in it brake releasing position but permits the switch blade 28 to resiliently snap into contact with the switch terminal 26 when the operating lever 14 is moved out of its brake release position.

The illustrated light switch 18 is operatively connected to the electrical circuit having the signal light wherein the switch blade 28 is connected to the motor vehicle ground and the switch terminal 26 is connected to the electrical circuit. Connected in this manner, the circuit is open at the switch terminal 26 and switch blade 28 when the operating lever 14 is in its brake release position, and thus the signal light is not illuminated, and the circuit is closed at the switch terminal 26 and switch blade 28 when the operating lever 14 is out of its brake release position, and thus the signal light is illuminated.

To apply the illustrated parking brake actuator 10, the operator grasps the hand grip 24 and pivots the operating lever 14 in an upward direction about the pivot pin 22 (clockwise as viewed in FIG. 2) to the brake engaging position. The locking mechanism 16 is adapted to allow this upward movement of the operating lever 14 but to prevent downward movement (counterclockwise as viewed in FIG. 2). As the operating lever 14 pivots out of its brake release position, the force applied by the operating lever 14 to the handle portion 44 of the switch blade 28 is reduced or removed so that the switch 28 blade resiliently snaps into contact with the switch terminal 26 to complete the electrical circuit and illuminate the signal light. The signal light indicates to the operator that the parking brake is applied.

To release the illustrated parking brake actuator, the operator grasps the hand grip 24, depresses a release button 56 to disengage the locking mechanism 16, and pivots the operating lever 14 in a downward direction (counterclockwise as viewed in FIG. 2). Rotation of the operating lever 14 untensions the parking brake cable 11 and disengages the parking brake. As the operating lever 14 pivots into its brake release position, a force is applied by the operating lever 14 to the handle portion 44 of the switch blade 28 so that the switch blade 28 resiliently moves out of contact with the switch terminal 26 to open the electrical circuit and stop illumination the signal light. The fact that the signal light is not illuminated indicates to the operator that the parking brake is not applied.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A parking brake actuator for a motor vehicle, said parking brake actuator comprising, in combination:
   a fixed support comprised of plastic;
   a lever pivotably connected to said support for movement between brake-releasing and brake-engaging positions;
   a locking mechanism adapted to releasably maintain said lever in said brake-engaging position;
   an electrical switch operable to indicate when said lever is out of said brake-releasing position;
   wherein said switch includes a blade comprised of an electrically conductive material and directly secured to said fixed support;
   wherein said switch includes a terminal comprised of an electrically conductive material and directly secured to said fixed support;
   wherein said switch is located near a mounting hole formed in the fixed support which receives a fastener to secure the fixed support to the motor vehicle; and
   wherein said switch blade extends to the mounting hole to electrically connect the blade to the fastener in the mounting hole to connect the switch to ground; and
   wherein said blade is spaced-apart from said terminal to open an electric circuit including the fastener when the lever is in the brake-releasing position and wherein said blade is in direct electrical contact with said terminal to close the electric circuit including the fastener when the lever is in the brake-engaging position.

2. The parking brake actuator according to claim 1, wherein said fixed support forms a unitary mounting bracket for securing said switch blade to the fixed support.

3. The parking brake actuator according to claim 2, wherein said unitary mounting bracket forms a slot for receiving a portion of said switch blade to secure the switch blade to the fixed support.

4. The parking brake actuator according to claim 2, wherein said fixed support and said unitary mounting bracket are molded of plastic as a one-piece component.

5. The parking brake actuator according to claim 2, wherein said mounting bracket secures said terminal of the switch to the fixed support.

6. The parking brake actuator according to claim 5, wherein said unitary mounting bracket forms a slot for receiving a portion of said terminal to secure the terminal to the fixed support.

7. The parking brake actuator according to claim 1, wherein said switch blade extends to the mounting hole to contact a conductive insert forming the mounting hole to electrically connect the switch blade to the fastener.

8. The parking brake actuator according to claim 1, wherein said switch blade and said switch terminal are each secured to said fixed support without mechanical fasteners.

9. A parking brake actuator for a motor vehicle, said parking brake actuator comprising, in combination:
a fixed support;
a lever pivotably connected to said support for movement between brake-releasing and brake-engaging positions;
a locking mechanism adapted to releasably maintain said lever in said brake-engaging position;
an electrical switch operable to indicate when said lever is out of said brake-releasing position;
wherein said switch includes a blade comprised of an electrically conductive material;
wherein said switch includes a terminal comprised of an electrically conductive material;
wherein said fixed support forms a unitary mounting bracket securing said switch blade and said switch terminal to the fixed support;
wherein said fixed support and said unitary mounting bracket are molded of plastic as a one-piece component;
wherein said switch is located near a mounting hole formed in the fixed support which receives a fastener to secure the fixed support to the motor vehicle;
wherein said switch blade extends to the mounting hole to electrically connect the blade to the fastener in the mounting hole to connect the switch to ground; and
wherein said blade is spaced-apart from said terminal to open an electric circuit including the fastener when the lever is in the brake-releasing position and wherein said blade is in direct electrical contact with said terminal to close the electric circuit including the fastener when the lever is in the brake-engaging position.

10. The parking brake actuator according to claim 9, wherein said unitary mounting bracket forms a slot for receiving a portion of said switch blade to secure the switch blade to the fixed support.

11. The parking brake actuator according to claim 9, wherein said switch blade extends to the mounting hole to contact a conductive insert forming the mounting hole to electrically connect the switch blade to the fastener.

12. The parking brake actuator according to claim 9, wherein said unitary mounting bracket forms a slot for receiving a portion of said terminal to secure the terminal to the fixed support.

13. The parking brake actuator according to claim 9, wherein said switch blade and said switch terminal are each secured to said fixed support without mechanical fasteners.

14. A parking brake actuator for a motor vehicle, said parking brake actuator comprising, in combination:
a fixed support comprised of plastic;
a lever pivotably connected to said support for movement between brake-releasing and brake-engaging positions;
a locking mechanism adapted to releasably maintain said lever in said brake-engaging position;
an electrical switch operable to indicate when said lever is out of said brake-releasing position;
wherein said switch includes a blade comprised of an electrically conductive material;
wherein said switch includes a terminal comprised of an electrically conductive material;
wherein said switch is located near a mounting hole formed in the fixed support which receives a fastener to secure the fixed support to the motor vehicle;
wherein said switch blade extends to the mounting hole to contact a conductive insert forming the mounting hole to electrically connect the switch to ground;
wherein said blade is spaced-apart from said terminal to open an electric circuit including the fastener when the lever is in the brake-releasing position and wherein said blade is in direct electrical contact with said terminal to close the electric circuit including the fastener when the lever is in the brake-engaging position.

15. The parking brake actuator according to claim 14, wherein said fixed support forms a unitary mounting bracket for securing said switch blade of the switch to the fixed support and wherein said fixed support and said unitary mounting bracket are molded of plastic.

16. The parking brake actuator according to claim 14, wherein said switch blade and said switch terminal are each secured to said fixed support without mechanical fasteners.

* * * * *